J. E. COSTA.
PIPE COUPLING.
APPLICATION FILED MAY 4, 1908.
947,711.
Patented Jan. 25, 1910.
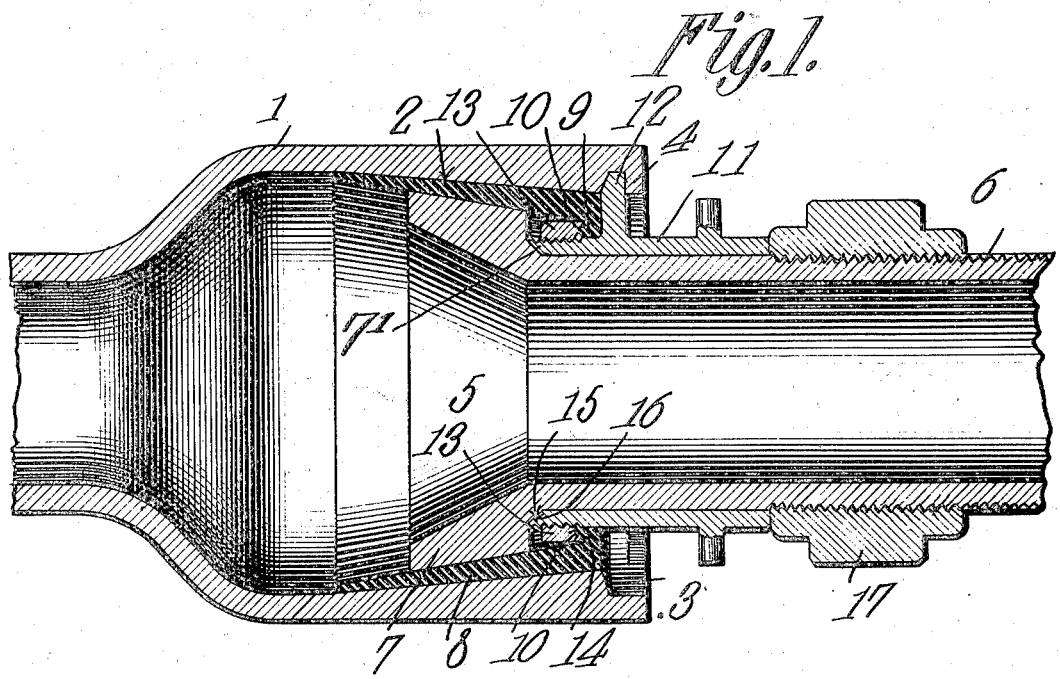
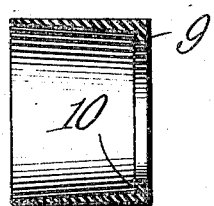
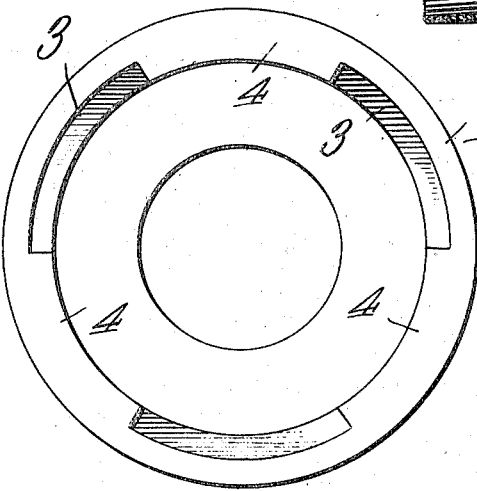
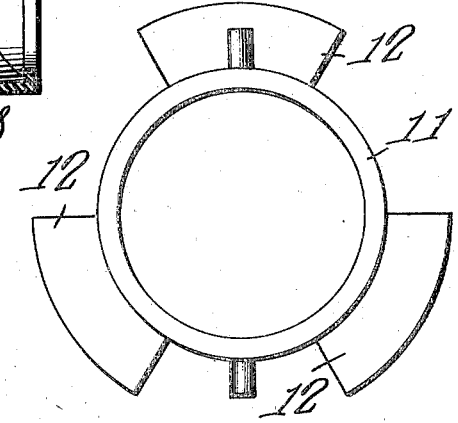
Inventor
Joseph E. Costa,
By
Attorneys
Witnesses

UNITED STATES PATENT OFFICE.

JOSEPH E. COSTA, OF DOWNEY, CALIFORNIA.

PIPE-COUPLING.

947,711.            Specification of Letters Patent.    Patented Jan. 25, 1910.

Application filed May 4, 1908. Serial No. 430,771.

*To all whom it may concern:*

Be it known that I, JOSEPH E. COSTA, a citizen of the United States, residing at Downey, in the county of Los Angeles and State of California, have invented a new and useful Pipe-Coupling, of which the following is a specification.

This invention relates to pipe couplings and has especial reference to high pressure unions.

The invention has for its object to provide an improved high pressure union or coupling, which will form a tight joint, and prevent leakage, and which will stand any pressure, and can be rapidly connected and disconnected.

Referring to the drawing, Figure 1 is a vertical section of a pipe coupling constructed in accordance with the invention. Fig. 2 is an end view of the female section or member. Fig. 3 is an end view of the lock nut. Fig. 4 is a view of a cup washer in vertical section on a reduced scale.

The coupling is provided with the female section 1, formed with its inner sides 2, inclined or tapering inwardly toward its open end, and with the internal circumferential openings 3, and intervening slotted portions 4 at its open end, the slots in the portions 4 connecting with the openings 3. A male section 5 having a tail piece 6, and an outwardly inclined spreader head 7, with inclined ground portion 7' is inserted in the section 1, and a cup shaped elastic washer 8 having a ring or circumferential flange 9 with inclined or beveled sides 10, is located about the inclined spreader head 7, and between it, and the inclined sides 2, of the section 1. A tubular lock nut 11 is mounted on the section 5, and has spaced projections or lugs 12, which are moved through the openings 3, in the end of section 1, and by turning the lock nut 11, are moved into the slots 4, to lock the nut to section 1. The lock nut 11 is provided at one end with a ring 13, having a threaded engagement with the nut 11 and bearing on the flange 9 of washer 8 by means of which the washer is held to the nut. The ring 13 has one of its edges 14 formed at an incline or bevel to engage with the inclined side 10 of the ring 9 of washer 8 and form an interlocking tight joint therewith. The nut 11 has its upper end formed with the inclined edge 15 which is adapted to bear against the inclined ground portion 7' of the head 7. Behind the nut 11, the tail piece 6 is provided with a threaded portion, with which engages a correspondingly threaded band or ring 17, adapted to bear against the lower end of the nut 11.

When the section 5 is inserted in section 1, the spreader head 7, is located at the outer end of cup washer 8 and the nut 11 being in locked position, the head 7 is drawn down within the cup washer by turning the band 17 which spreads the washer and forces it against the inclined walls 2, of the section 1, and against the lugs 12 of the nut 11. The washer 8 is normally straight as shown in Fig. 4, which permits it to be moved into, and out of section 1 when the spreader head is at the outer end of the washer and when the spreader head is pulled into the washer it expands the latter, and leaves a portion of the washer extending above the spreader head and exposed to the pressure thereby insuring a tight joint. The ground joint provided between spreader head, and lock nut, effectually prevents leakage.

The parts of the joint are easily disconnected by unscrewing band 17, and pushing the tail piece forward, which allows the cup shaped washer to come to an upright position. The lock nut is then turned to release it from section 1.

By means of the construction and arrangement of parts herein set forth, the male and female members of the coupling may be securely locked together thus forming a practically air and water tight joint.

Having described the invention, I claim.

1. A pipe coupling consisting of a female section with inner tapering sides; a male section with a spreader head having tapering sides, a washer having an internal annular flange, said washer being clamped between the said head, and the female section; a nut having projections interlocking with the female section, and a ring engaging the flanged washer and clamping it against said projections.

2. A pipe coupling consisting of a female section with tapering inner sides; a male section with a spreader head having tapering sides; a washer with an internal annular flange, and a nut interlocking with the female section and having an adjustable ring engaging and clamping the flange of the washer.

3. A pipe coupling consisting of a female section having inner inclined sides and section with spreader head, having outwardly tapering sides; a flanged washer clamped between said spreader head and the female section; a nut interlocking with the female section and engaging the flanged washer; and a rotary threaded ring mounted on the tail of the male section and abutting against the nut.

4. A pipe coupling consisting of a female section having inner inclined sides and spaced slots and openings at its open end; a male section having a spreader head with outwardly tapering sides, an elastic cup shaped flanged washer expanded and clamped between said head and female section and extending beyond the head; a nut with projections engaging and interlocking with the slotted end of the female section and having a ring engaging the flanged washer; and a revoluble ring screwed onto the tail portion of the male member and abutting against the nut.

In testimony that I claim the foregoing as my own, I have hereto affixed my signature in the presence of two witnesses.

JOSEPH E. COSTA.

Witnesses:
R. L. SCOTT,
OWEN GALLAGHER.